(12) United States Patent
Egedal et al.

(10) Patent No.: US 11,719,226 B2
(45) Date of Patent: Aug. 8, 2023

(54) WIND TURBINE CONTROL METHOD AND SYSTEM

(71) Applicant: Siemens Gamesa Renewable Energy A/S, Brande (DK)

(72) Inventors: Per Egedal, Herning (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 222 days.

(21) Appl. No.: 17/299,616

(22) PCT Filed: Oct. 31, 2019

(86) PCT No.: PCT/EP2019/079833
§ 371 (c)(1),
(2) Date: Jun. 3, 2021

(87) PCT Pub. No.: WO2020/120015
PCT Pub. Date: Jun. 18, 2020

(65) Prior Publication Data
US 2022/0018334 A1 Jan. 20, 2022

(30) Foreign Application Priority Data

Dec. 13, 2018 (EP) .................................. 18212378

(51) Int. Cl.
*F03D 7/04* (2006.01)
*F03D 7/02* (2006.01)
*F03D 17/00* (2016.01)

(52) U.S. Cl.
CPC ............. *F03D 7/046* (2013.01); *F03D 7/028* (2013.01); *F03D 7/0224* (2013.01); *F03D 17/00* (2016.05);
(Continued)

(58) Field of Classification Search
CPC ........ F03D 7/0224; F03D 7/028; F03D 7/046; F03D 17/00; F05B 2260/80;
(Continued)

(56) References Cited

U.S. PATENT DOCUMENTS 10,364,797 B2 * 7/2019 Caponetti ............... F03D 7/046
10,669,990 B2 * 6/2020 Kjær ..................... F03D 7/0224
(Continued)

FOREIGN PATENT DOCUMENTS

EP 3290688 A1 3/2018
WO 2018054439 A1 3/2018

OTHER PUBLICATIONS

Plumley, C.E., et al.: "Supplementing wind turbine pitch control with a trailing edge flap smart rotor," 3rd Renewable Power Generation Conference (RPG 2014). pps. 8.34-8.34, XP055343775, DOI: 10.1049/cp.2014.0919; ISBN: 978-1-84919-917-9, Abstract; Sections 2-6; the whole document; 2014; 6 pages.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A method of controlling a wind turbine including a plurality of rotor blades, a first controller for controlling an adaptive flow regulating system having a plurality of individually controllable adaptive flow regulating devices arranged on the rotor blades, and a second controller for controlling a pitch regulating system for regulating a pitch angle of each rotor blade. The method includes (a) determining a diagnostic value indicative of an operational efficiency of the
(Continued)

Figure 1:
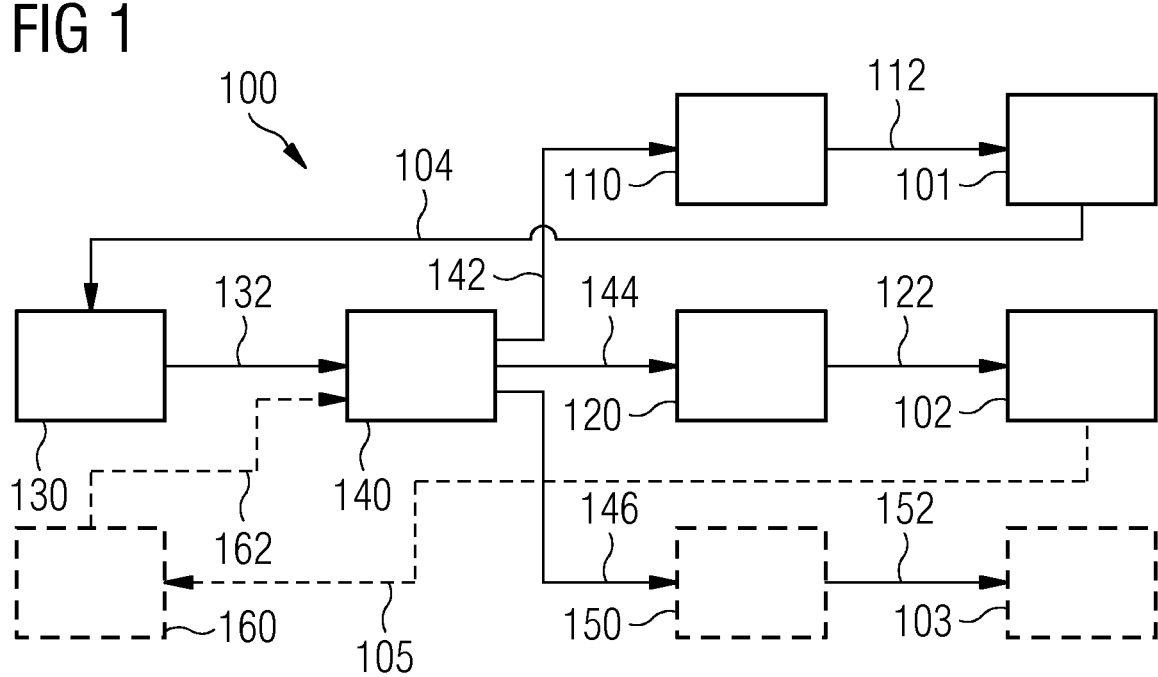

adaptive flow regulating system, (b) determining a first gain value for the first controller and a second gain value for the second controller based on the diagnostic value, (c) applying the first gain value to control signals for the adaptive flow regulating system generated by the first controller, and (d) applying the second gain value to control signals for the pitch regulating system generated by the second controller, is provided.

12 Claims, 1 Drawing Sheet

(52) U.S. Cl.
CPC ... *F05B 2260/80* (2013.01); *F05B 2270/1033* (2013.01); *F05B 2270/328* (2013.01); *F05B 2270/335* (2013.01); *F05B 2270/404* (2013.01)

(58) Field of Classification Search
CPC ........ F05B 2270/1033; F05B 2270/328; F05B 2270/335; F05B 2270/404
See application file for complete search history.

(56) References Cited

U.S. PATENT DOCUMENTS

2013/0280067 A1   10/2013   Goodman et al.
2018/0010577 A1*  1/2018   Caponetti ............. F03D 7/0272

OTHER PUBLICATIONS

International Search Report and Written Opinion for corresponding PCT Patent Application No. PCT/EP2019/079833 dated Jan. 28, 2020. 14 pages.
Extended European Search Report in corresponding European Patent Application No. 18212378.6 dated Jun. 13, 2019. 6 pages.

* cited by examiner

WIND TURBINE CONTROL METHOD AND SYSTEM

CROSS-REFERENCE TO RELATED APPLICATIONS

This application is a national stage entry of PCT Application No. PCT/EP2019/079833 having a filing date of Oct. 31, 2019, which claims priority to European Patent Application No. 18212378.6, having a filing date of Dec. 13, 2018, the entire contents of which are hereby incorporated by reference.

FIELD OF TECHNOLOGY

The following relates to the field of wind turbines, in particular to a method of controlling a wind turbine. Furthermore, the following relates to a system for controlling a wind turbine, and a wind turbine comprising such a control system.

BACKGROUND

It is generally known to operate wind turbines in various kinds of safe modes to protect the wind turbines in certain situations. Such a safe mode of operating may include some form of curtailment, such as:
Reduction of rotor speed
Reduction of power
Increased pitch angle (less aggressive, lowered angle of attract)
It may also include:
Modified threshold for monitoring function (overspeed, vibration etc.)
Modified allowed wind speed range (earlier cut-out to stop the turbine at high wind speeds)
Deactivation of certain features
All of the above limits may be modified based on environmental conditions, such as wind turbulence, wind speed, wind shear, air density, wind direction, ambient temperature, measured loading of main components. Estimates of the above may also be used.

Furthermore, different levels of safe mode may be used. E.g., one that ensures acceptable ultimate structural loading and one that further reduces ultimate and fatigue loading. Additional steps may be included. The different modes may be used based on the expected duration of the required safe mode. This may be determined manually by an operator or based on the fault mode and/or duration of fault(s) etc.

With the increasing complexity of modern wind turbine control systems, there may however be a need for a way of providing effective safe modes of operation in wind turbines utilizing such control systems.

SUMMARY

According to a first aspect of the present invention there is provided a method of controlling a wind turbine, the wind turbine comprising a plurality of rotor blades, a first controller for controlling an adaptive flow regulating system having a plurality of individually controllable adaptive flow regulating devices arranged on the rotor blades, and a second controller for controlling a pitch regulating system for regulating a pitch angle of each rotor blade. The method comprises (a) determining a diagnostic value indicative of an operational efficiency of the adaptive flow regulating system, (b) determining a first gain value for the first controller and a second gain value for the second controller based on the diagnostic value, (c) applying the first gain value to control signals for the adaptive flow regulating system generated by the first controller, and (d) applying the second gain value to control signals for the pitch regulating system generated by the second controller.

This aspect of the present invention is based on the idea that both (the first and the second) controllers are active but that respective gain values (or weights) are applied to them in dependency on the operational efficiency of the adaptive flow regulating system. Thereby, depending on said operational efficiency, the contributions of the respective first and second controllers can be modified. For example, if the operational efficiency is low (e.g. due to an error or defect in the adaptive flow regulating system), the contribution of the second controller can be increased to compensate for this. In many cases this will allow a wind turbine generator to remain active until repair is made.

In the present context, the term "adaptive flow regulating devices" may in particular denote a device capable of influencing the flow characteristics at a given section of the rotor blade surface. In some embodiments, the adaptive flow regulating devices may be implemented as adjustable spoilers or flaps, which may e.g. be selectively and adjustably raised (e.g. by pneumatic actuation) above the surface of the rotor blade.

In the present context, the term "operational efficiency" may in particular denote a capability of the adaptive flow regulating system to operate as intended. Thus, maximum operational efficiency corresponds to a state without any errors or defects, while an error or defect, e.g. one or more defective adaptive flow regulating devices, will cause a corresponding reduction of the operational efficiency. The diagnostic value may in particular be obtained on the basis of feedback and status signals from the adaptive flow regulating system.

According to an embodiment of the present invention, the first gain value is set to a first maximum gain value and the second gain value is set to a second minimum gain value when the diagnostic value is equal to a maximum diagnostic value, and the first gain value is set to a first minimum gain value and the second gain value is set to a second maximum gain value when the diagnostic value is equal to a minimum diagnostic value.

In other words, the influence of the first controller will be maximal when the operational efficiency of the adaptive flow regulating system is maximal and minimal when the operational efficiency of the adaptive flow regulating system is minimal. At the same time, the influence of the second controller will be minimal when the operational efficiency of the adaptive flow regulating system is maximal and maximal when the operational efficiency of the adaptive flow regulating system is minimal. Thus, the second controller takes over when the adaptive flow regulating system is ineffective.

According to a further embodiment of the present invention, the first gain value is decreased and the second gain value is increased when the diagnostic value decreases.

Thereby, the reduced efficiency of the adaptive flow regulating system is compensated by the pitch regulating system.

According to a further embodiment of the present invention, the first gain value is increased and the second gain value is decreased when the diagnostic value increases.

Thereby, when the efficiency of the adaptive flow regulating system increases, e.g. after a temporary problem or error, the assistance provided by the pitch regulating system is reduced.

According to a further embodiment of the present invention, the wind turbine further comprises a third controller for controlling an output power regulating system of the wind turbine, and the method further comprises (a) determining a third gain value for the third controller based on the diagnostic value, and (b) applying the third gain value to a control signal for the output power regulating system generated by the third controller.

Here, the power regulating system of the wind turbine is used in addition to the pitch angle regulating system as described above. This may further improve the compensation, in particular in cases where the operating efficiency of the adaptive flow regulating system is low.

According to a further embodiment of the present invention, the third gain value is set to a third minimum gain value when the diagnostic value is equal to the maximum diagnostic value, and the third gain value is set to a third maximum gain value when the diagnostic value is equal to the minimum diagnostic value.

According to a further embodiment of the present invention, the third gain value is increased when the diagnostic value decreases, and/or the third gain value is decreased when the diagnostic value increases.

According to a further embodiment of the present invention, the maximum diagnostic value corresponds to 100% operational efficiency of the adaptive flow regulating system, and the minimum diagnostic value corresponds to 0% operational efficiency of the adaptive flow regulating system.

According to a further embodiment of the present invention, the first maximum gain value, the second maximum gain value, and the third maximum gain value are equal to one, and the first minimum gain value, the second minimum gain value, and the third minimum gain value are equal to zero.

According to a further embodiment of the present invention, the method further comprises determining a further diagnostic value indicative of an operational efficiency of the pitch regulating system, wherein the first gain value and the second gain value are further based on the further diagnostic value.

In this embodiment, the adaptive flow regulating system can be used for compensation in situations where the operational efficiency of the pitch regulating system decreases, e.g. due to an error.

According to a second aspect of the present invention, there is provided a control system for a wind turbine, the wind turbine comprising a plurality of rotor blades, an adaptive flow regulating system having a plurality of individually controllable adaptive flow regulating devices arranged on the rotor blades, and a pitch regulating system for regulating a pitch angle of each rotor blade. The control system comprises (a) a first controller for controlling the adaptive flow regulating system, (b) a second controller for controlling the pitch regulating system, (c) a diagnostic unit for determining a diagnostic value indicative of an operational efficiency of the adaptive flow regulating system, and (d) a controller gain unit adapted to determine a first gain value for the first controller and a second gain value for the second controller based on the diagnostic value, wherein (e) the first controller is adapted to apply the first gain value to control signals for the adaptive flow regulating system, and wherein (f) the second controller is adapted to apply the second gain value to control signals for the pitch regulating system.

This aspect of the present invention is based on essentially the same idea as the first aspect discussed above.

According to a third aspect of the present invention, there is provided a wind turbine comprising a control system according to the second aspect discussed above.

The aspects defined above and further aspects of the present invention are apparent from the examples of embodiments to be described hereinafter and are explained with reference to the examples of embodiments. The embodiment of the present invention will be described in more detail hereinafter with reference to examples of embodiments. However, it is explicitly noted that the present invention is not limited to the described exemplary embodiments.

BRIEF DESCRIPTION

Figure 2:
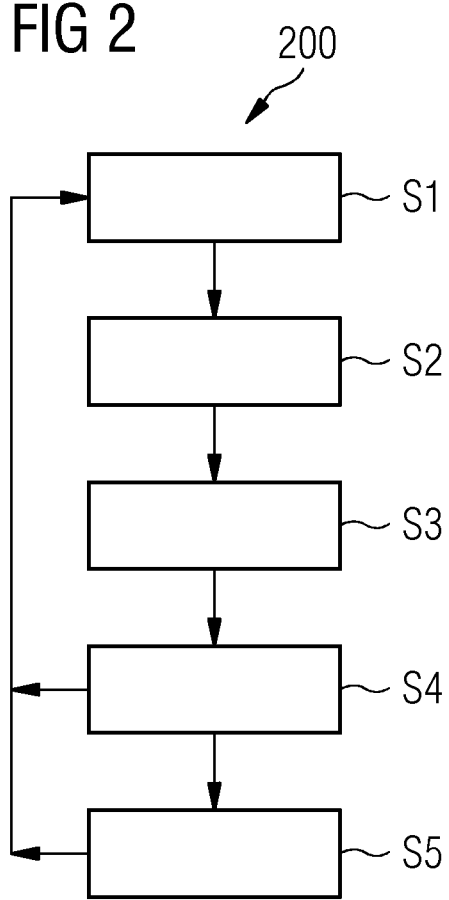

Some of the embodiments will be described in detail, with reference to the following figures, wherein like designations denote like members, wherein:

FIG. 1 depicts a block diagram of a control system according to an embodiment of the present invention; and FIG. 2 depicts a flow diagram of a method of controlling a wind turbine according to an embodiment of the present invention.

DETAILED DESCRIPTION

The illustration in the drawing is schematic. It is noted that in different figures, similar or identical elements are provided with the same reference numerals or with reference numerals which differ only within the first digit.

FIG. 1 shows a functional block diagram of a control system 100 according to an embodiment of the present invention. More specifically, the control system 100 comprises a first controller 110 for generating and supplying control signal(s) 112 to an adaptive flow regulating system 101, a second controller 120 for generating and supplying control signal(s) 122 to a pitch angle regulating system 102, a diagnostic unit 130 for determining a diagnostic value 132 indicative of an operational efficiency of the adaptive flow regulating system 101 based on feedback signal 104, and a controller gain unit 140 adapted to determine a first gain value 142 for the first controller 110 and a second gain value 144 for the second controller 120 based on the diagnostic value 132. The first controller 110 applies the first gain value to control signals for the adaptive flow regulating system 101, e.g. by multiplication, in order to generate control signal(s) 112, and the second controller applies the second gain value 144 to control signals for the pitch angle regulating system 102, e.g. by multiplication, in order to generate control signal(s) 122. Optionally, the control system 100 may further comprise a third controller 150 for generating control signal(s) 152 to output power regulating system 103. In this case, the controller gain unit 140 is further adapted to determine a third gain value 146 for the third controller 150 based on the diagnostic value 132. Further optionally, the control system 100 may further comprise a further diagnostic unit 160 for determining a further diagnostic value 162 indicative of an operational efficiency of the pitch angle regulating system 102 based on feedback signal 105.

Operation and functioning of the control system 100 will now be described with reference to FIG. 2 which shows a flow diagram of a method 200 of controlling a wind turbine according to an embodiment of the present invention. The method 200 begins at S1 where the diagnostic unit 130 determines a diagnostic value 132 indicative of an operation efficiency of the adaptive flow regulating system 101 based on the feedback signal 104. The feedback signal 104 may e.g. contain information on the functional state of each adaptive flow regulating device in the adaptive flow regulating system. Based on this information, the diagnostic unit 130 determines the diagnostic value 132, which may e.g. be a value between 0% and 100%, where 0% corresponds to a non-working adaptive flow regulating system while 100% corresponds to a perfectly working adaptive flow regulating system. In other words, any value between 0% and 100% indicates how many of the adaptive flow regulating devices are working and how well.

The method 200 continues at S2, where the controller gain unit 140 determines a first gain value 142 for the first controller 110 and a second gain value 144 for the second controller 120 based on the diagnostic value 132. If the optional third controller 150 is present, a third gain value 146 for this third controller 150 may also be determined at this stage. When the diagnostic value 132 equals 100%, the first gain value 142 is set to its maximum value, e.g. 1 (one) and the second gain value 144 is set to its minimum value, e.g. 0 (zero). On the other hand, when the diagnostic value 132 equals 0%, the first gain value 142 is set to its minimum value, e.g. 0 and the second gain value 144 is set to its maximum value, e.g. 1. For a diagnostic value 132 between 0% and 100%, say 50%, both the first gain value 142 and the second gain value 144 are set to a value between the respective maximum and minimum values, such as both being equal to 0.5. Generally, when the diagnostic value 132 decreases, the first gain value 142 is decreased and the second gain value 144 is increased. Similarly, when the diagnostic value 132 increases, the first gain value 142 is increased and the second gain value 144 is decreased.

The method 200 continues at S3, where the first gain value 142 is applied by the first controller 110 to generate control signal(s) 112, and at S4, where the second gain value 144 is applied by the second controller 120 to generate control signal(s) 122. This results in a weighting of the influence of the first 110 and second 120 controllers. More specifically, when the first gain value 142 equals 1 and the second gain value 144 equals 0, only the first controller 110 has an actual influence. Thus, in this case, the 100% functioning adaptive flow regulating system 101 is solely responsible. In the other extreme situation, where the first gain value 142 equals 0 and the second gain value 144 equals 1, only the pitch regulating system 102 is active. For first and second gain values between 0 and 1, both the adaptive flow regulating system 101 and the pitch angle regulating system 102 will be active. Thus, in this case, where the operational efficiency of the adaptive flow regulating system 101 is less than 100%, the pitch angle regulating system 102 takes over and assists the only partially working adaptive flow regulating system 101.

The method 200 may now return to S1 and repeat the steps and operations discussed above. However, if the optional third controller 150 is present and a corresponding third gain value 146 has been determined at S2 as discussed above, then such third gain value 146 is applied by the third controller 150 to generate control signal(s) 152 for the output power regulating system 103, e.g. in order to apply additional curtailment in certain situations. Thereafter, the method 200 returns to S1 as discussed above.

In embodiments comprising the optional further diagnostic unit 160, the further diagnostic value 162 may be used at S1 of the method 200 instead of or in addition to the diagnostic value 132. Thereby, in cases where the pitch angle regulating system 102 is not working optimally, i.e. at less than 100% operational efficiency, the adaptive flow regulating system 101 may compensate this in a similar manner as discussed above for the case where the adaptive flow regulating system 101 is not working optimally.

Generally, the present invention is capable of assuring a safe and continued operation of a wind turbine in a case where either the adaptive flow regulating system 101 or the pitch angle regulating system 102 is working with less than optimal efficiency, e.g. due to one or more defective components.

Although the present invention has been disclosed in the form of preferred embodiments and variations thereon, it will be understood that numerous additional modifications and variations could be made thereto without departing from the scope of the present invention.

For the sake of clarity, it is to be understood that the use of "a" or "an" throughout this application does not exclude a plurality, and "comprising" does not exclude other steps or elements.

What is claimed:

1. A method of controlling a wind turbine, the wind turbine comprising a plurality of rotor blades, a first controller for controlling an adaptive flow regulating system having a plurality of individually controllable adaptive flow regulating devices arranged on the rotor blades, and a second controller for controlling a pitch regulating system for regulating a pitch angle of each rotor blade, the method comprising:
    determining a diagnostic value indicative of an operational efficiency of the adaptive flow regulating system;
    determining a first gain value for the first controller and a second gain value for the second controller based on the diagnostic value;
    applying the first gain value to control signals for the adaptive flow regulating system generated by the first controller; and
    applying the second gain value to control signals for the pitch regulating system generated by the second controller.

2. The method according to claim 1, wherein the first gain value is set to a first maximum gain value and the second gain value is set to a second minimum gain value when the diagnostic value is equal to a maximum diagnostic value, and wherein the first gain value is set to a first minimum gain value and the second gain value is set to a second maximum gain value when the diagnostic value is equal to a minimum diagnostic value.

3. The method according to claim 1, wherein the first gain value is decreased and the second gain value is increased when the diagnostic value decreases.

4. The method according to claim 1, wherein the first gain value is increased and the second gain value is decreased when the diagnostic value increases.

5. The method according to claim 1, wherein the wind turbine further comprises a third controller for controlling an output power regulating system of the wind turbine, the method further comprising:
    determining a third gain value for the third controller based on the diagnostic value; and
    applying the third gain value to a control signal for the output power regulating system generated by the third controller.

6. The method according to claim 5, wherein the third gain value is set to a third minimum gain value when the diagnostic value is equal to the maximum diagnostic value, and wherein the third gain value is set to a third maximum gain value when the diagnostic value is equal to the minimum diagnostic value.

7. The method according to claim 5, wherein the third gain value is increased when the diagnostic value decreases, and/or wherein the third gain value is decreased when the diagnostic value increases.

8. The method according to claim 2, wherein the maximum diagnostic value corresponds to 100% operational efficiency of the adaptive flow regulating system, and wherein the minimum diagnostic value corresponds to 0% operational efficiency of the adaptive flow regulating system.

9. The method according to claim 2, wherein the first maximum gain value, the second maximum gain value, and the third maximum gain value are equal to one, and wherein the first minimum gain value, the second minimum gain value, and the third minimum gain value are equal to zero.

10. The method according to claim 1, further comprising:
    determining a further diagnostic value indicative of an operational efficiency of the pitch regulating system; and
    wherein the first gain value and the second gain value are further based on the further diagnostic value.

11. A control system for a wind turbine, the wind turbine comprising a plurality of rotor blades, an adaptive flow regulating system having a plurality of individually controllable adaptive flow regulating devices arranged on the rotor blades, and a pitch regulating system for regulating a pitch angle of each rotor blade, the control system comprising:
    a first controller for controlling the adaptive flow regulating system;
    a second controller for controlling the pitch regulating system;
    a diagnostic unit for determining a diagnostic value indicative of an operational efficiency of the adaptive flow regulating system; and
    a controller gain unit configured to determine a first gain value for the first controller and a second gain value for the second controller based on the diagnostic value;
    wherein the first controller is configured to apply the first gain value to control signals for the adaptive flow regulating system; and
    wherein the second controller is configured to apply the second gain value to control signals for the pitch regulating system.

12. A wind turbine comprising the control system according to claim 11.

* * * * *